United States Patent [19]

Cousin et al.

[11] Patent Number: 4,729,457
[45] Date of Patent: Mar. 8, 1988

[54] AUTOMATICALLY ADJUSTABLE AND THERMALLY LOCKABLE STRUT FOR A DRUM BRAKE

[75] Inventors: Xavier Cousin, Paris; Jean-Claude Mery, Pavillons-sous-Bois, both of France

[73] Assignee: Bendix France, Drancy, France

[21] Appl. No.: 903,168

[22] Filed: Sep. 3, 1986

[30] Foreign Application Priority Data

Sep. 19, 1985 [FR] France .................. 85 13906

[51] Int. Cl.⁴ .......................... F16D 65/66
[52] U.S. Cl. .................. 188/79.5 B; 188/196 BA
[58] Field of Search .............. 188/79.5 B, 79.5 GE, 188/79.5 P, 196 BA

[56] References Cited

U.S. PATENT DOCUMENTS

| | | | |
|---|---|---|---|
| 2,292,017 | 8/1942 | Smith | 188/79.5 B |
| 2,570,398 | 10/1951 | Smith | 188/79.5 |
| 3,213,970 | 10/1965 | Dombeck et al. | 188/196 BA |
| 3,794,145 | 2/1974 | Margetts | 188/79.5 P |
| 3,983,970 | 10/1976 | Courbot | 188/79.5 B |
| 4,148,380 | 4/1979 | Haraikawa | 188/79.5 |
| 4,243,125 | 1/1981 | Spaargaren et al. | 188/79.5 P |
| 4,375,252 | 3/1983 | Aono et al. | 188/79.5 P |
| 4,385,681 | 5/1983 | Conrad et al. | 188/79.5 B |
| 4,503,949 | 3/1985 | Carré et al. | 188/79.5 |
| 4,646,881 | 3/1987 | Denree et al. | 188/79.5 B |

FOREIGN PATENT DOCUMENTS

| | | |
|---|---|---|
| 0077726 | 4/1983 | European Pat. Off. |
| 471519 | 9/1937 | United Kingdom ........... 188/79.5 B |
| 2049077 | 12/1980 | United Kingdom ........... 188/79.5 B |

Primary Examiner—Randolph A. Reese
Assistant Examiner—Anthony Knight
Attorney, Agent, or Firm—Larry J. Palguta; Ken C. Decker

[57] ABSTRACT

The strut, mounted in the vicinity of the brake application mechanism and bearing with each of its ends against each of the shoes (3, 4), has a device which automatially extends according to the wear of the friction components and which consists of a nut-and-bolt system (8–11) operated by a pawl (12) engaging with teeth (11) integral with the nut. The pawl (12) is mounted on an elastic leaf (13) integral with the strut and separated elastically therefrom by a rocker lever (14) which, by tilting, allows the leaf (13) to move toward the strut when the shoes are pushed apart, thus enabling the pawl (12) to cause the nut (11) to rotate and, therefore, the length of the strut to increase. A bimetallic strip (30) is capable of counteracting the tilting movement of the lever (14) when the brake is hot.

6 Claims, 6 Drawing Figures

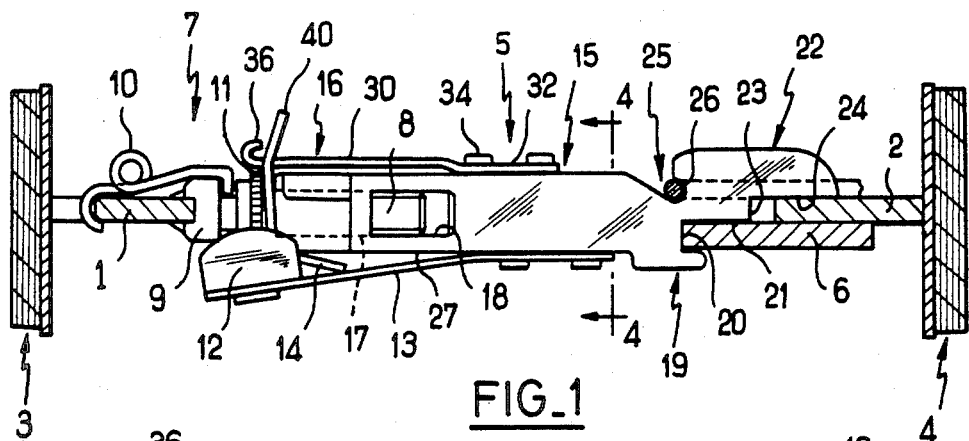
FIG_1
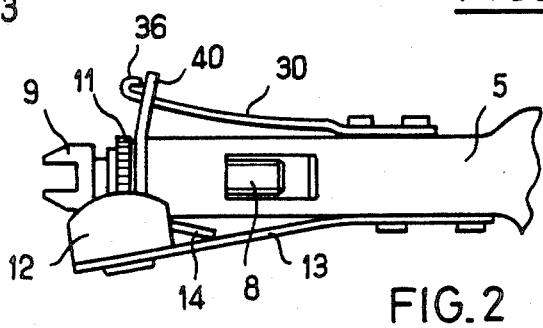
FIG_2
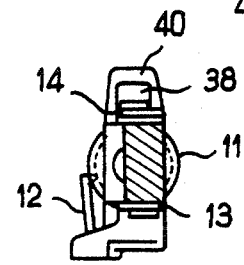
FIG_4
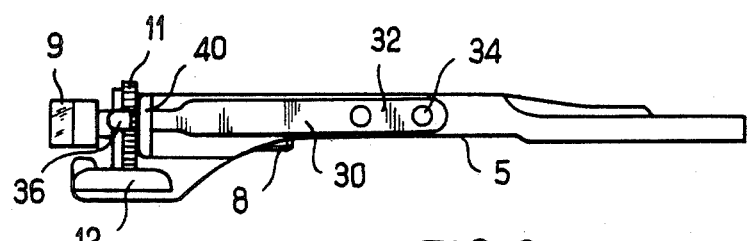
FIG_3
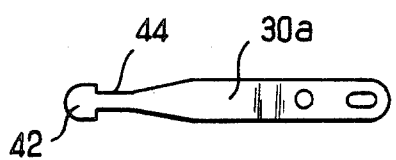
FIG_6
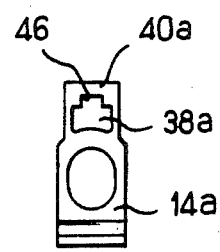
FIG_5

AUTOMATICALLY ADJUSTABLE AND THERMALLY LOCKABLE STRUT FOR A DRUM BRAKE

The present invention relates to automatic adjustment devices intended to compensate automatically for the wear of the friction linings of brake shoes in a drum brake and, more particularly, to a thermally lockable automatic adjustment strut for a drum brake, intended to be mounted between two brake shoes, the strut comprising a strut body and a nut-and-bolt system, the bolt of which is received in a seating in the strut body and the nut of which co-operates selectively with a pawl integral with an elastic leaf mounted on the strut body.

A strut of this type is described in the document EP-A-0,077,726 in the name of the Applicant and the application FR-84/14331, the contents of which are assumed to be incorporated herein for reference.

According to the present invention there is provided an automatically adjustable and thermally lockable strut for a drum brake, which is intended to be mounted in the vicinity of brake application means arranged between two first ends of two shoes lined with friction components, the strut, bearing with each of its ends against each of the two shoes, having a device which automatically extends according to the wear of the friction components and consists of a nut-and-bolt system operated by a pawl engaging with teeth integral with one of the members of the nut-and-bolt system, the pawl being mounted on an elastic leaf integral with the strut, the leaf being separated elastically from the strut, when the brake is at rest, by means of a rocker lever mounted on the strut, the lever allowing, by tilting, the leaf to move towards the strut when the said shoes are pushed apart. The strut is characterized in that it comprises temperature-sensitive means acting on the lever so as to prevent it from tilting and, consequently, prohibit adjustment when the brake overheats. According to another characteristic feature of the invention, these temperature-sensitive means consist of a bimetallic strip.

The U.S. Pat. No. 2,570,398 proposed an automatic adjustment device consisting of a ratchet system acting on a nut-and-bolt system so as to extend a strut as the friction components become worn. The step-down ratio obtained by this device enables adjustment to be performed by means of successive approach movements; moreover, in order to avoid over-adjustment due to temporary excessive heating, a bimetallic strip is used as a pawl in order to rotate the ratchet wheel, the pawl being separated from the wheel at a predetermined high temperature.

This device has the drawback, on the one hand, of having a large number of small-size components and, on the other hand, of having members fixed to one of the shoes and members fixed to the strut; the fitting of such a brake and any operations which may have to be performed during the life of this brake are complicated and risk causing a deterioration of the components which could impede normal operation of this device. Moreover, the use of the material forming a bimetallic leaf, in order to produce the pawl, is very debatable in view of the consequent erratic co-operation between the pawl and the ratchet wheel according to the variations in temperature.

This is one of the reasons why the invention aims to modify the actuating lever of the automatic adjustment system, which co-operates with the pawl, and not replace the pawl with a bimetallic strip.

The invention will now be described by way of example with reference to the accompanying drawings in which:

FIG. 1 is a diagrammatic view of a thermally lockable automatic adjustment device for a drum brake according to the invention, the locking mechanism being inoperative;

FIG. 2 is a view, similar to that shown in FIG. 1, showing the thermal locking mechanism in action;

FIG. 3 is a plan view of the device shown in FIGS. 1 and 2;

FIG. 4 is a sectional view, taken along the line 4—4 of FIG. 1;

FIG. 5 shows a second embodiment of the lever of FIG. 4, and

FIG. 6 shows a second embodiment of the bimetallic strip of FIG. 3.

In accordance with the teaching of EP-A-0,077,726 and FR-84/14331 mentioned above, FIG. 1 shows an automatic adjustment strut arranged, so as to be supported at each of its ends, between the central portions 1 and 2 of two brake shoes 3 and 4 of a motor-vehicle drum brake, the automatic adjustment strut being arranged in the vicinity of the brake application means (not shown) also arranged between the two shoes 3 and 4 so as to push the latter apart, in friction engagement against the drum of the brake (also not shown). The automatic adjustment strut comprises a strut body 5 intended to co-operate, at one of its ends, with the central portion 2 of the brake shoe 4 and with a hand-brake lever 6 of the drum brake, and a nut-and-bolt system 7 intended to co-operate, at one of its ends, with the central portion 1 of the other brake shoe 3. The nut-and-bolt system 7 has a bolt 8 provided with a head 9 kept in engagement, by means of a spring 10, with the central portion 1 of the brake shoe 3, and a nut 11 mounted on the bolt 8 and having, externally, ratchet teeth intended to co-operate selectively with a pawl 12 integral with an elastic leaf 13 mounted on the strut body 5. As will be seen below, the pawl 12 is normally kept separated from the teeth of the nut 11 by a rocker or adjusting angle-piece 14 mounted freely on the bolt 8 and arranged between the nut 11 and the flat end face adjacent to the strut body 5, as described in the above-mentioned document EP-A-0,077,726.

In accordance with FR-84/14331, the strut body 5 is made as a single casting, preferably of cast bronze. The strut body 5 has an elongated main part in the form of a beam 15 with a cross-section substantially equivalent to a parallelepiped having, at one end, an enlarged head 16 with a substantially square cross-section, through which there passes longitudinally a bore 17 extending, inside the main part 15, beyond the end head 16, through a cylindrical part having the same diameter and partially closed peripherally, i.e. having an open lateral portion 18 resulting from the difference in thickness between the main part 15 and the end head 16. At the opposite end to the end head 16, the elongated main part 15 ends, at the bottom (see FIG. 1), in a part forming a hook 19 intended to receive the section of the hand-brake lever 6 and defining, for the latter, a base forming a stop 20 and a lateral bearing surface 21. The elongated main part 15 ends, at the top (see FIG. 1), in an extension flange 22 connected to the surface 21 of the part forming a hook 19 by a shoulder 23 and forming a longitudinal contact surface 24 for an adjacent surface of the central portion 2 of the corresponding brake block 4. In addition, the extension flange 22 is connected to the top of the elongated main part 15 by a zone forming a hook 25 intended to receive the end of a spring 26 fixed, moreover, to the central portion 2 of the brake shoe 4 so as to pull the latter towards the shoulder 23.

The bottom surface 27 (see FIG. 1) of the elongated main part 15 of the strut body 5 is substantially flat and has two lugs projecting outwards, perpendicularly to this surface 27, in the vicinity of the part forming a hook 19, and intended to be received in corresponding holes of the elastic leaf 13, the lugs being cast directly as one piece with the strut body 5. The leaf 13 is fixed onto the strut body 5 by means of crimping of the ends of the lugs.

A more detailed description now follows of the locking device which forms the subject of the present invention.

The locking device consists of a bimetallic strip 30 fixed, at one of its ends 32, to the strut body 5 by swaging the protuberances forming lugs 34 molded integrally with the body. The surface of the bimetallic strip 30 which expands is located adjacent to the top of the body 5 (when viewing the drawing). At ambient temperature, the strip extends parallel to the body 5 at a small distance from the latter. The hook-shaped free end 36 of the bimetallic strip 30 engages inside an opening 38 of an extension 40 of the plate of the adjusting angle-piece 14, as shown in FIG. 4. The extension 40 is folded down slightly in relation to the plane of the plate. This arrangement allows the hook 36 to engage more easily with the upper edge of the opening 38 when the bimetallic strip is heated and assumes the position in which it is shown in FIG. 2 so as to lock the angle-piece forming an actuating lever.

FIG. 5 shows a lever 14a and FIG. 6 shows a bimetallic strip 30a in accordance with a variation. The window 38a of the extension 40a has, at the top, a cut-out section 46 provided for receiving the narrow part 44 connecting the body of the bimetallic strip 30a to an end-piece 42.

The bimetallic strip according to this variation is more economical to manufacture than a bimetallic strip with the hook 36.

The general method of operation of the automatic adjustment device shown in FIG. 1, without the thermal locking mechanism which is the subject of the present invention, will now be recalled.

When at rest, the spring (not shown), which pulls the shoes 3 and 4 towards each other, pushes the strut body 5 and the nut-and-bolt system 7 towards each other, thereby pressing the plate of the adjusting angle-piece 14 on the one hand against the flat end face of the head 16 of the strut body 5 and against the adjacent nut 11. In doing so, the arm of the adjusting angle-piece 14 disengages the elastic leaf 13 from the surface 27 of the strut body 5 and, consequently, the pawl 12 (integral with the leaf 13 or elastically articulated with the latter) from the teeth of the nut 11.

When the brake application means are operated, the shoes 3 and 4 are pushed apart from each other, thus tending to separate the strut body 5 and the nut-and-bolt system 7 from each other, thereby enabling the plate of the adjusting angle-piece 14 to resume an inclined position in relation to the bolt 8 on which it is mounted and hence enabling the elastic leaf 13 to move elastically towards the surface 27 of the strut body 5 while bringing the pawl 12 into engagement with the teeth of the nut 11, thereby tending to cause the latter to rotate in relation to the bolt 8 until the leaf 13 assumes its rest position in relation to the strut body 5. When the brake is released, the two shoes 3 and 4 move towards each other again, thereby tending to compress the strut, which again causes the plate of the adjusting angle-piece 14 to tilt so as to disengage the pawl 12 from the teeth of the nut 11.

The method of operation described above is normal when, with the brake cold, the bimetallic strip 30 assumes the position in which it is shown in FIG. 1, where the lever 14 is allowed to tilt freely without the hook 36 engaging with the upper edge of the window 38 in the extension 40 of the said lever.

When the brake overheats, the bimetallic strip changes shape and assumes the position in which it is shown in FIG. 2. If the lever 14 has the tendency to tilt when the brake is applied, the upper edge of the window 38 in its extension 40 comes up against the hook 36, thereby preventing the free end of the lever from acting in any way on the leaf 13 carrying the pawl. The automatic adjustment mechanism may therefore be considered thermally locked until the bimetallic strip returns into its position parallel to the body 5 of the strut.

We claim:

1. An automatically adjustable and thermally lockable strut for a drum brake, intended to be mounted in the vicinity of brake application means arranged between two first ends of two shoes lined with friction components, the strut, which bears at each end against a respective shoe, having a device which automatically extends according to wear of the friction components and which comprises a nut-and-bolt system operated by a pawl engaging with teeth of one of the members of the nut-and-bolt system, the pawl being mounted on an elastic leaf connected with the strut, the leaf elastically separated from the strut, when the brake is at rest, by means of a rocker lever mouted on the strut, the lever allowing, by tilting, the leaf to move toward the strut when the shoes are pushed apart, characterized in that the strut comprises temperature-sensitive means acting directly on the lever so as to prevent the lever from tilting and, consequently, prohibiting adjustment when the brake overheats, the temperature-sensitive means comprising a bi-metallic strip, the lever being formed by a plate mounted with diametral play on the bolt of the nut-and-bolt system and extended by an arm which forms an angle of less than 180° with the plane of the plate, a free end of the arm cooperating with the leaf carrying the pawl, the lever having an extension of the plate located opposite the arm projecting outside the strut so as to directly engage with the bimetallic strip mounted on the strut in order to lock the lever in a position where the pawl is separated from the teeth.

2. The strut according to claim 1, characterized in that the extension of the plate projecting outside the strut has an opening into which a free end of the bimetallic strip penetrates, the strip being fixed at the other end to the strut and the strip having a part which expands the most being disposed adjacent the strut, the free end of the strip comprising means capable of cooperating with edges of the opening when the bimetallic strip is heated.

3. The strut according to claim 2, characterized in that the free end of the bimetallic strip has a hook pointing toward the free end of the extension.

4. The strut according to claim 2, characterized in that the free end of bimetallic strip is flat and has a T-shaped head capable of cooperating with a cutaway section of the opening when the bimetallic strip is heated.

5. The strut according to claim 2, characterized in that the extension projecting outside the strut is angled slightly toward the other end of the bimetallic strip which is fixed to the strut.

6. The strut according to claim 2, characterized in that the the bimetallic strip is fixed to the strut by swaging protuberances formed integrally with the strut.

* * * * *